United States Patent
Boggs (10) Patent No.: US 9,720,613 B2
(45) Date of Patent: Aug. 1, 2017

(54) METHOD AND SYSTEM FOR PREVENTING REUSE OF CYLINDER ID INDEXES IN A COMPUTER SYSTEM WITH MISSING STORAGE DRIVES

(71) Applicant: Teradata US, Inc., Dayton, OH (US)

(72) Inventor: Gary Lee Boggs, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 27 days.

(21) Appl. No.: 14/983,804

(22) Filed: Dec. 30, 2015

(65) Prior Publication Data

US 2016/0188248 A1 Jun. 30, 2016

Related U.S. Application Data

(60) Provisional application No. 62/098,049, filed on Dec. 30, 2014.

(51) Int. Cl.
*G06F 3/06* (2006.01)
*G06F 17/30* (2006.01)

(52) U.S. Cl.
CPC .......... *G06F 3/0631* (2013.01); *G06F 3/0604* (2013.01); *G06F 3/0689* (2013.01); *G06F 17/30336* (2013.01); *G06F 17/30595* (2013.01)

(58) Field of Classification Search
CPC .... G06F 3/0604; G06F 3/0607; G06F 3/0631; G06F 3/0689; G06F 12/023; G06F 12/0284; G06F 17/30336; G06F 17/40595; G06F 2212/657; G06F 3/0619; G06F 12/0646; G06F 17/30595
USPC .......................... 707/696; 711/170, 171, 209
See application file for complete search history.

(56) References Cited

U.S. PATENT DOCUMENTS

| | | | |
|---|---|---|---|
| 2011/0060887 A1* | 3/2011 | Thatcher | G06F 3/0604 711/171 |
| 2015/0363447 A1* | 12/2015 | Dickie | G06F 17/30312 707/696 |
| 2016/0196168 A1* | 7/2016 | Koizumi | G06F 9/5077 718/104 |

* cited by examiner

*Primary Examiner* — Gary Portka
(74) *Attorney, Agent, or Firm* — James Stover (57) ABSTRACT

A system and method for allocating storage devices within a multi-node data storage system. The system maintains a data structure including a generation number indicating an incarnation of the data structure, a highest cylinder ID index value observed to be in use within the data storage system, and a safe index value indicating a lowest cylinder ID index value for use when allocating a new cylinder index. Following receipt of an allocation request, the system assigns a cylinder ID index to the allocation request, the cylinder ID index being greater than the safe index value. The assigned cylinder ID index is compared to the highest cylinder ID index value observed to be in use within said data storage system, and when the cylinder ID index is greater than the highest cylinder ID index value, increments the generation number and highest cylinder ID index value maintained within the data structure.

11 Claims, 10 Drawing Sheets

WHERE:
• DEVICE STATUS HASH IS A SHA-1 (OR OTHER) HASH OF ONE ENTRY PER DEVICE (PDISK). EACH ENTRY HAS THE FORM:

PRESENT = 1
MISSING = 0

ASSUME: BATCH SIZE = 10,000

FIG. 13

ASSUME: BATCH SIZE = 10,000

FIG. 14

ASSUME: BATCH SIZE = 10,000

METHOD AND SYSTEM FOR PREVENTING REUSE OF CYLINDER ID INDEXES IN A COMPUTER SYSTEM WITH MISSING STORAGE DRIVES

CROSS REFERENCE TO RELATED APPLICATIONS

This application claims priority under 35 U.S.C. §119(e) to the following co-pending and commonly-assigned patent application, which is incorporated herein by reference:

Provisional Patent Application Ser. No. 62/098,049, entitled "METHOD AND SYSTEM FOR PREVENTING REUSE OF CYLINDER ID INDEXES IN A COMPUTER SYSTEM WITH MISSING STORAGE DRIVES," filed on Dec. 30, 2014, by Gary Boggs.

FIELD OF THE INVENTION

The present invention relates to data warehouse systems, and more particularly, to an improved system and method for allocating and managing storage resources to optimize system performance.

BACKGROUND OF THE INVENTION

A database is a collection of stored data that is logically related and that is accessible by one or more users or applications. A popular type of database is the relational database management system (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

One of the goals of a database management system is to optimize the performance of queries for access and manipulation of data stored in the database. Given a target environment, an optimal query plan is selected, with the optimal query plan being the one with the lowest cost, e.g., response time, as determined by an optimizer. The response time is the amount of time it takes to complete the execution of a query on a given system.

In computer systems featuring a plurality of storage devices, storage space of hard disks (HDDs), solid state storage devices (SSDs), or other storage medium, can be managed to ensure that the most frequently accessed data stays on the faster storage devices. One such system, Teradata Virtual Storage (TVS) by Teradata Corporation, attempts to achieve optimal system performance by placing the most frequently accessed data (hottest) in the locations with lowest average response time (fastest).

In a Teradata Database system, the Teradata Virtual Storage subsystem allocates storage for Teradata Access Module Processors (AMPs), described below, and identifies these units of storage, known as cylinders, by an identifier known as a cylinder identifier or cylinder ID. One component of this cylinder ID is an index field which, along with other fields in the cylinder ID, is used to logically identify the piece of storage. TVS may move the contents of the cylinder from one physical location to another, but will still refer to these contents by the same cylinder ID. The cylinder ID to physical location relationship is stored in a map on the disk where the cylinder currently resides. Algorithms in TVS attempt to keep the maximum index value as small as possible to limit the amount of memory required for lookup. Indexes can be reused when a cylinder is freed. The cylinder ID created from the re-used index may point to a cylinder on a different disk from the original cylinder.

This process works fine as long as all disks which might hold cylinders for an AMP are accessible during startup so that TVS can determine all of the cylinder ID indexes that are in-use for the AMP. If in-use indexes are not accounted for because a disk is missing, they may be reused and corruption will occur when the failed disk is returned to service because there will be duplicate cylinder IDs. Because of this, and the fact that other components of the Teradata Database system in addition to TVS have trouble starting up with cylinders missing, AMPs that might be affected by a missing disk are kept offline in a state known as "FATAL**" to prevent any allocations that might result in a duplicate cylinder ID index.

There is a desire to be able to startup the database system with some storage components missing. A method to prevent the assignment of duplicate cylinder ID indexes during startup is desired.

Simple solutions such as segregating cylinder IDs by device do not work because TVS can migrate cylinders between devices and the cylinder ID must not be changed when the cylinder is moved. A system for keeping track of the highest index allocated and using an increment above that when a disk is down has the problem of escalating values if there are multiple restarts while the device is missing, i.e., each restart will look at the highest index assigned and increment it to be safe and the incremented value becomes the new high value for the next restart. Maintaining a mirror copy of each disk's map on an alternate disk is another solution that may be desirable for other reasons, but it uses a large amount of disk space to hold the duplicate maps and also requires writes to both disks to write the modified map blocks when the map is updated. The invention described below provides a solution to the reuse and escalation problems discussed above without a mirrored map or significant memory or disk space overhead.

Teradata Virtual Storage, also referred to as Virtual Storage System (VSS), is described in U.S. Pat. Nos. 7,562,195 and 8,375,193, which are incorporated by reference herein.

BRIEF DESCRIPTION OF THE DRAWINGS

Aspects of the present disclosure are best understood from the following detailed description when read with the accompanying figures, in which.

DETAILED DESCRIPTION OF THE INVENTION

It is to be understood that the following disclosure provides many different embodiments or examples for implementing different features of various embodiments. Specific examples of components and arrangements are described below to simplify the present disclosure. These are, of course, merely examples and are not intended to be limiting.

Contemporary database system tools enable system resources, such as storage disks, to be profiled to allow users to stipulate "temperatures" to specific storage device zones thereby providing the opportunity to improve performance by placing special, frequently accessed data on faster portions of devices. Modern database systems may feature groups of individual disk drives or other storage media, and thus a zone of contiguous storage space, such as a track, sectors, blocks, extents, etc., of a particular device can't be assumed to be, for example, fastest based on the zone's ID. As referred to herein, a data storage device zone comprises a contiguous physical section of storage space of a data storage medium. A device profiler allows testing each zone individually and assignment of a numerical value representing a profiled access speed to the tested zone. Further, users may assign a relative temperature to an allocation request and to provide guidelines on how devices should be split-up amongst performance zones. As referred to herein, a data "temperature" comprises a data access frequency quantifier that specifies the frequency of access of particular data. For example, data that is frequently accessed may be qualified with a temperature of "HOT" while data that is infrequently accessed may be assigned a temperature of "COOL."

Figure 1:
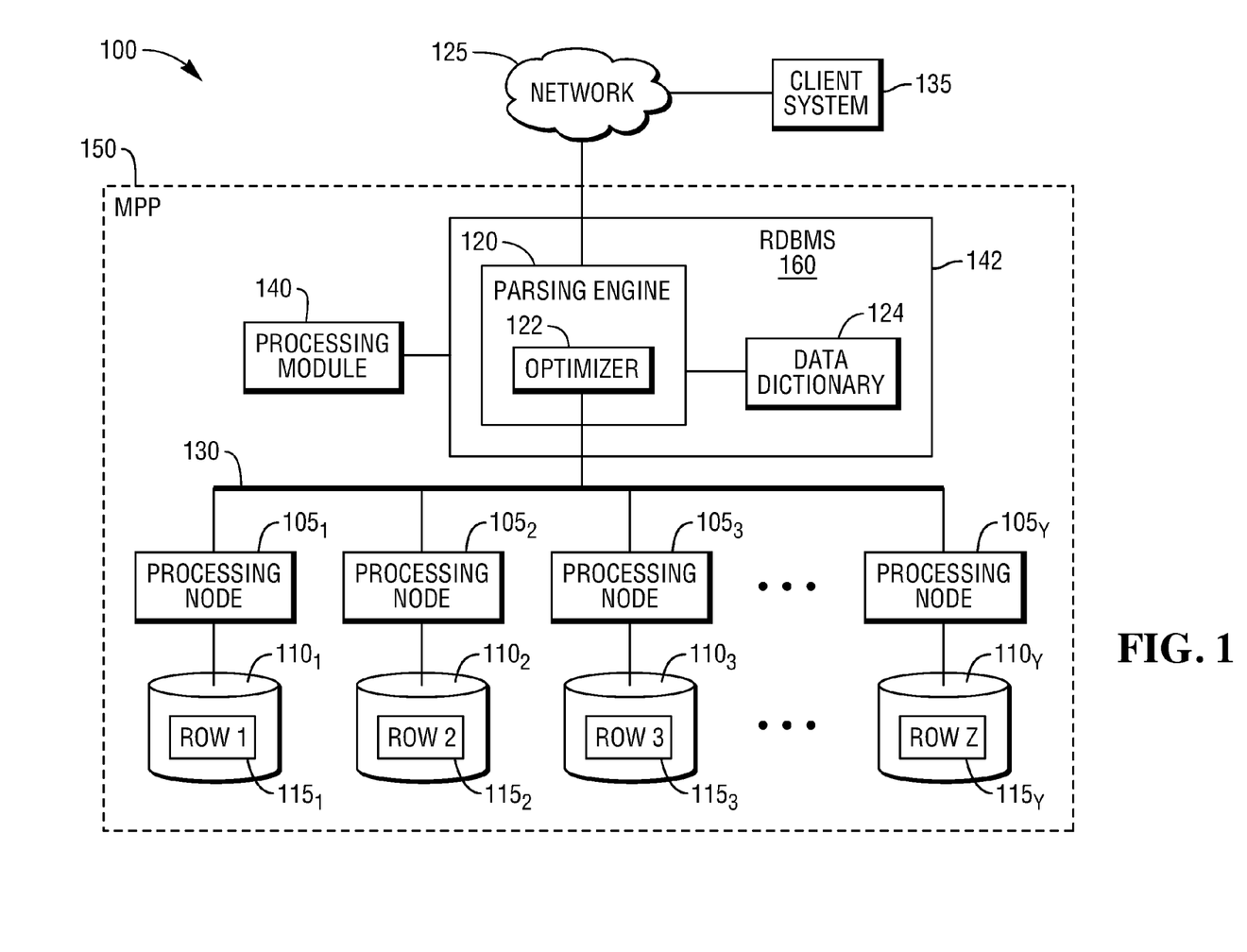
FIG. 1 depicts a diagrammatic representation of an exemplary architecture for a large database system that is suited for implementing data management and performance optimization mechanisms in accordance with disclosed embodiments.

FIG. 1 depicts a diagrammatic representation of an exemplary architecture for a large database system $100$, such as a Teradata Active Data Warehouse System, that is suited for implementing data allocation and migration mechanisms in accordance with disclosed embodiments. The database system $100$ includes a relational database management system (RDBMS) $160$ built upon a massively parallel processing (MPP) system $150$. Other types of database systems, such as object-relational database management systems (ORDBMS) or those built on symmetric multi-processing (SMP) platforms, are also suited for use, and the depicted and described architecture is exemplary only and is chosen to facilitate an understanding of the disclosed embodiments.

As shown, the database system $100$ includes one or more processing nodes $105_{1 \ldots Y}$ that manage the storage and retrieval of data in data storage facilities $110_{1 \ldots Y}$. Each of the processing nodes may host one or more physical or virtual processing modules, such as one or more access module processors (AMPS). Each of the processing nodes $105_{1 \ldots Y}$ manages a portion of a database that is stored in a corresponding one of the data storage facilities $110_{1 \ldots Y}$. Each of the data-storage facilities $110_{1 \ldots Y}$ includes one or more disk drives or other storage medium.

The system stores data in one or more tables in the data-storage facilities $110_{1 \ldots Y}$. The rows $115_{1 \ldots Y}$ of the tables are stored across multiple data storage facilities $110_{1 \ldots Y}$ to ensure that the system workload is distributed evenly across the processing nodes $115_{1 \ldots Y}$. A parsing engine $120$ organizes the storage of data and the distribution of table rows $115_{1 \ldots Y}$ among the processing nodes $105_{1 \ldots Y}$ and accesses processing nodes $115_{1 \ldots Y}$ via an interconnect $130$. The parsing engine $120$ also coordinates the retrieval of data from the data storage facilities $110_{1 \ldots Y}$ in response to queries received from a user, such as one at a client computer system $135$ connected to the database system $100$ through a network $125$ connection. The parsing engine $120$, on receiving an incoming database query, applies an optimizer $122$ component to the query to assess the best plan for execution of the query. Selecting the optimal query execution plan includes, among other things, identifying which of the processing nodes $115_{1 \ldots Y}$ are involved in executing the query and which database tables are involved in the query, as well as choosing which data-manipulation techniques will serve best in satisfying the conditions of the query. To this end, the parser and/or optimizer may access a data dictionary $124$ that specifies the organization, contents, and conventions of one or more databases. For example, the data dictionary $124$ may specify the names and descriptions of various tables maintained by the MPP system $150$ as well as fields of each database. Further, the data dictionary $124$ may specify the type, length, and/or other various characteristics of the stored tables. The database system typically receives queries in a standard format, such as the Structured Query Language (SQL) put forth by the American National Standards Institute (ANSI).

Figure 2:
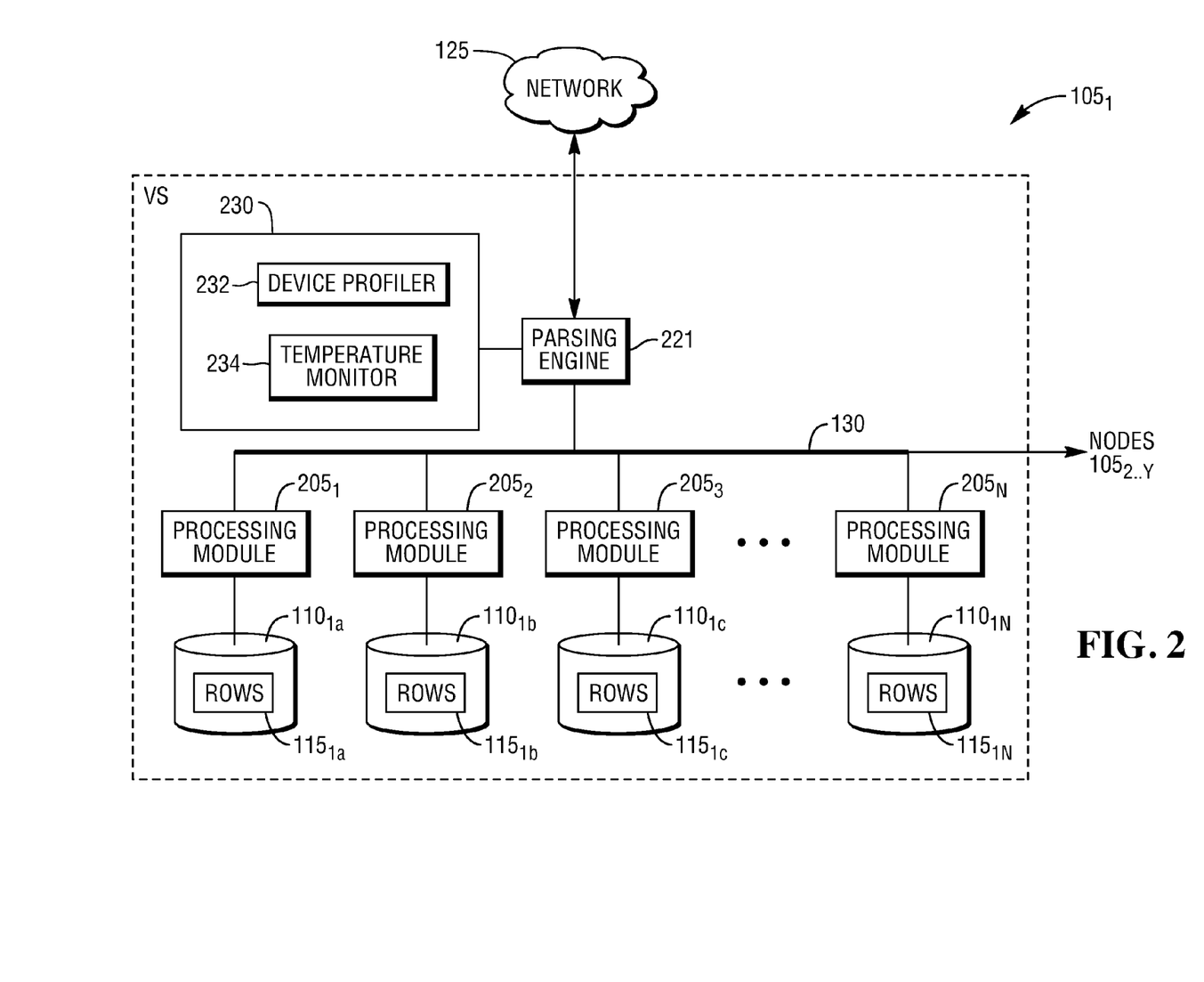
FIG. 2 depicts a diagrammatic representation of a sample architecture for one node of the database system depicted in FIG. 1 implemented in accordance with an embodiment.

FIG. 2 depicts a diagrammatic representation of a sample architecture for one node $105_1$ of the DBS $100$. The DBS node $105_1$ includes one or more processing modules $205_{1 \ldots N}$ connected by an interconnect $130$ that manage the storage and retrieval of data in data storage facilities $110_{1a \ldots 1N}$. Each of the processing modules $205_{1 \ldots N}$ may be one or more physical processors or each may be a virtual processor, with one or more virtual processors running on one or more physical processors. For the case in which one or more virtual processors are running on a single physical processor, the single physical processor swaps between the set of N virtual processors. For the case in which N virtual processors are running on an M-processor node, the node's operating system schedules the N virtual processors to run on its set of M physical processors. If there are four virtual processors and four physical processors, then typically each virtual processor would run on its own physical processor. If there are eight virtual processors and four physical processors, the operating system would schedule the eight virtual processors against the four physical processors, in which case swapping of the virtual processors would occur.

Each of the processing modules $205_{1 \ldots N}$ manages a portion of a database that is stored in a corresponding one of the data storage facilities $110_{1a \ldots 1N}$. Each of the data storage facilities $110_{1a \ldots 1N}$ includes one or more disk drives or other storage mediums. The DBS may include multiple nodes $105_{2 \ldots Y}$ in addition to the illustrated node $105_1$ connected by way of the interconnect $130$.

The system stores data in one or more tables in the data-storage facilities $110_{1a \ldots 1N}$. The rows $115_{1a \ldots 1N}$ of the tables are stored across multiple data storage facilities $110_{1a \ldots 1N}$ to ensure that the system workload is distributed evenly across the processing modules $205_{1 \ldots N}$. A parsing engine $221$ organizes the storage of data and the distribution of table rows $110_{1a \ldots 1N}$ among the processing modules $205_{1 \ldots N}$. The parsing engine $221$ also coordinates the retrieval of data from the data-storage facilities $110_{1a \ldots 1N}$ in response to queries received from a user at a client computer system $135_1 \ldots _N$. The DBS 100 usually receives queries and commands to build tables in a standard format, such as SQL.

In one implementation, the rows $115_{1a} \ldots _{1N}$ are distributed across the data storage facilities $110_{1a} \ldots _{1N}$ by the parsing engine 221 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket." The hash buckets are assigned to data-storage facilities $110_{1a} \ldots _{1N}$ and associated processing modules $205_1 \ldots _N$ by a hash bucket map. The characteristics of the columns chosen for the primary index determine how evenly the rows are distributed.

Figure 3:
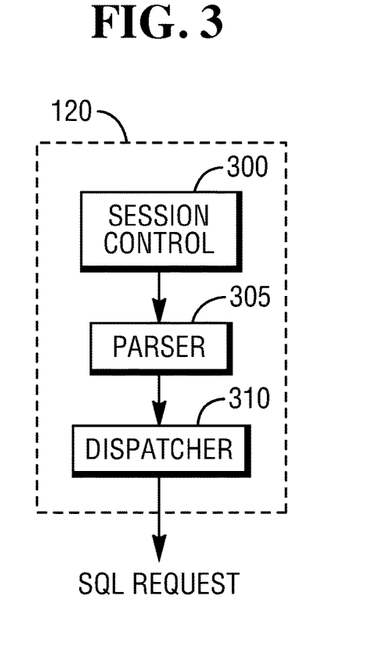
FIG. 3 is a diagrammatic representation of a parsing engine implemented in accordance with an embodiment.
Figure 4:
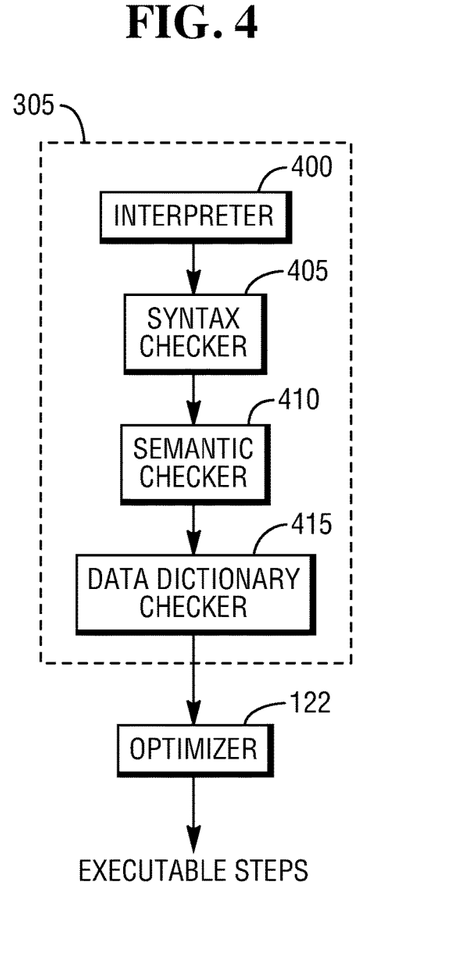
FIG. 4 is a diagrammatic representation of a parser implemented in accordance with an embodiment.

In one example system, a parsing engine, such as the parsing engine 120, is made up of three components: a session control 300, a parser 305, and a dispatcher 310 as shown in FIG. 3. The session control 300 provides the logon and logoff functions. It accepts a request for authorization to access the database, verifies it, and then either allows or disallows the access. Once the session control 300 allows a session to begin, a user may submit a SQL request that is routed to the parser 305. As illustrated in FIG. 4, the parser 305 interprets the SQL request (block 400), checks the request for correct SQL syntax (block 405), evaluates the request semantically (block 410), and consults a data dictionary to ensure that all of the objects specified in the SQL request exist and that the user has the authority to perform the request (block 415). Finally, the parser 305 runs the optimizer 122 that selects the least expensive plan to perform the request.

In accordance with an embodiment, the system 100 may feature a virtual storage system (TVS) 230, hosted by one or more of the nodes, such as node $105_1$ depicted in FIG. 2. TVS system 230 may include a device profiler 232 and a temperature monitor module 234, each implemented as a set of computer-executable instructions tangibly embodied on a computer-readable medium that are executable by a processing system, such as one or more processing nodes $105_1$-$105_Y$. In an embodiment, the device profiler 232 is configured to differentiate between storage device zones based on the zone's input/output speed performance on any given device. In this manner, for a particular storage device, the device profiler 232 is able to determine with high accuracy whether one zone of a storage device exhibits faster or slower data access than another storage zone of the storage device or another zone of a different storage device. The temperature monitor 234 may periodically monitor the frequency with which data is accessed within the system 100 and may update a data access frequency quantifier associated therewith accordingly. For example, in disclosed embodiments, data may be associated with data access frequency quantifiers of "HOT," "WARM," and "COOL" that respectively indicate the corresponding data is frequently accessed, moderately accessed, and infrequently accessed. The temperature monitor 234 may periodically evaluate the amount of data accesses to a particular set of data and update the corresponding data access frequency quantifier accordingly.

Figure 5:
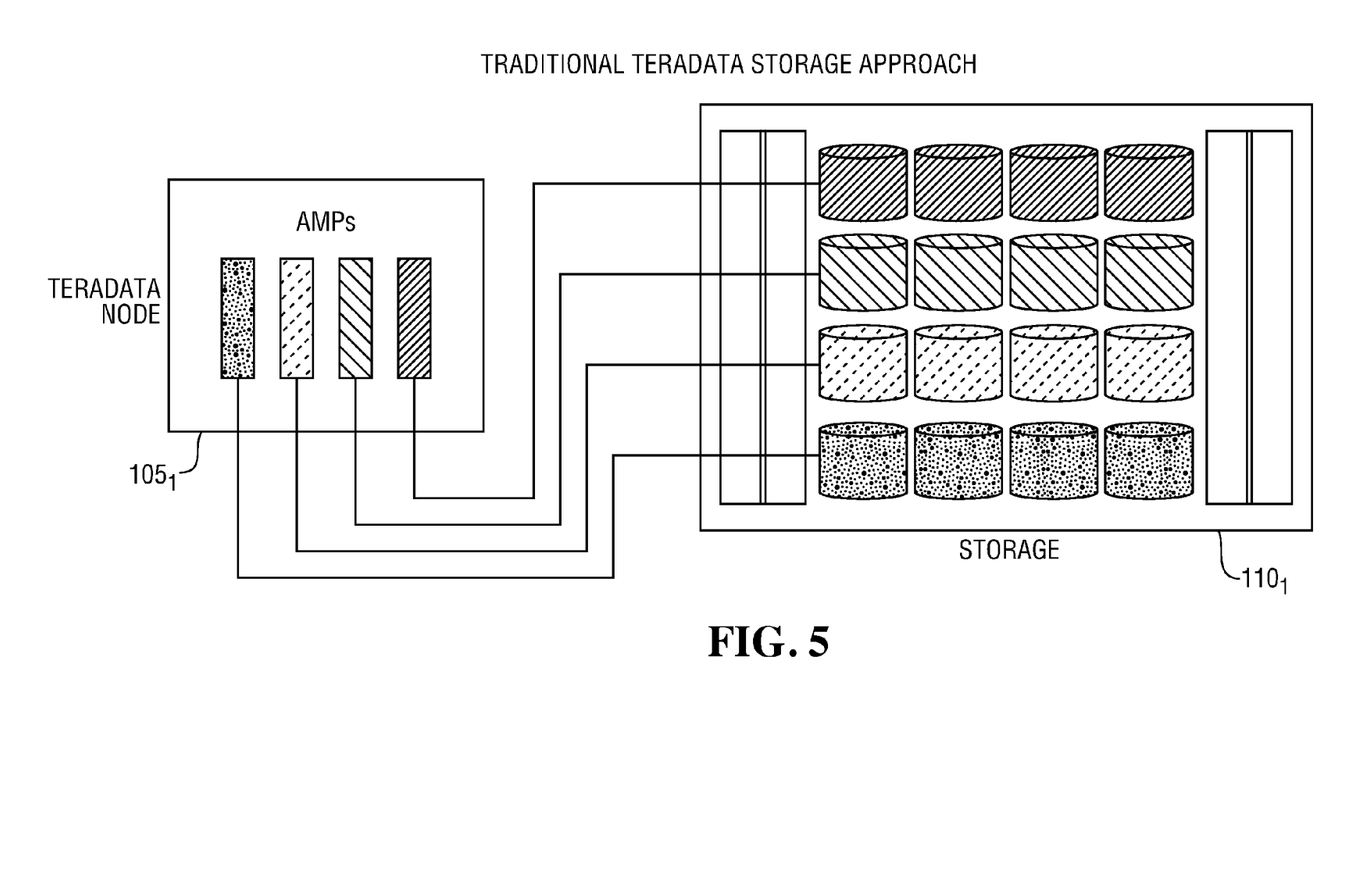
FIG. 5 is a simple illustration of the allocation of data storage in a traditional Teradata Corporation data warehouse system.
Figure 6:
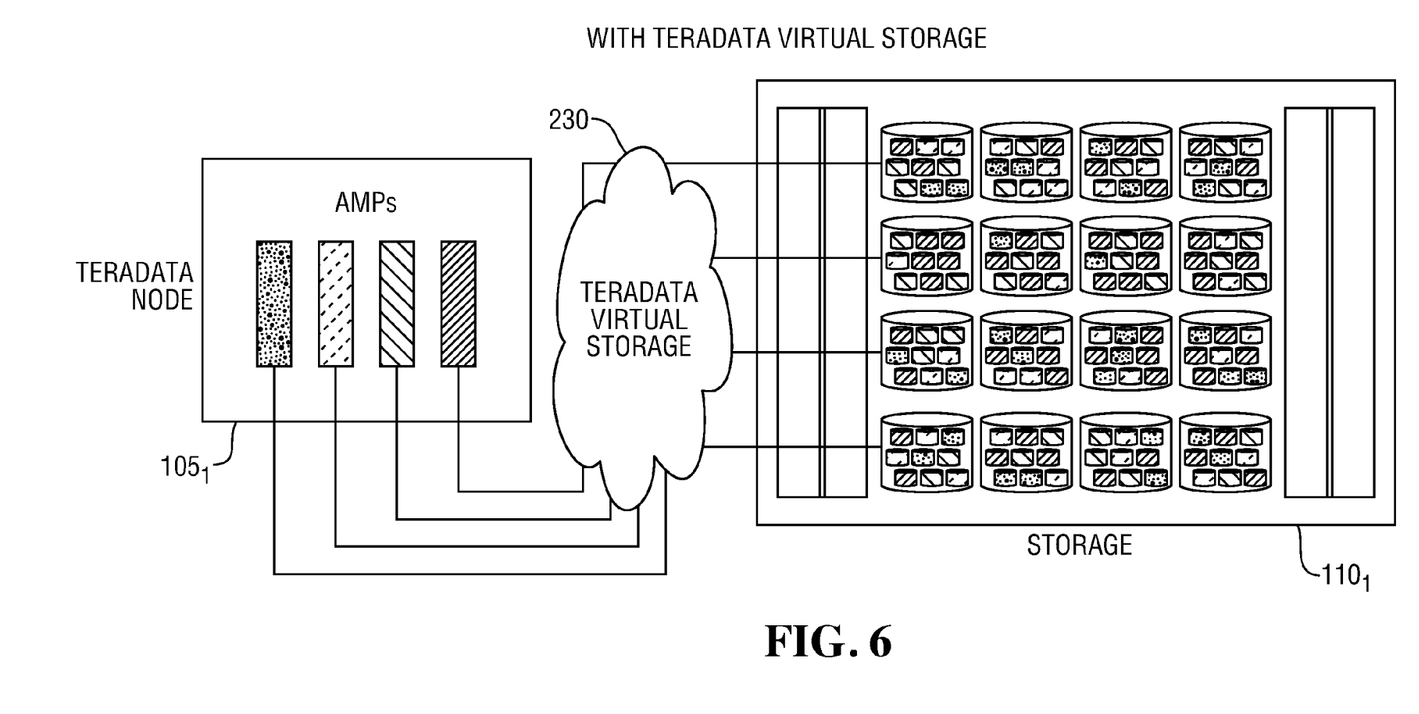
FIG. 6 is a simple illustration of the allocation of data storage in a Teradata Corporation data warehouse system utilizing Teradata Virtual Storage System (TVS).

The Teradata Virtual Storage system replaces traditional fixed assignment disk storage with a virtual connection of storage to the data warehouse's AMPs, as illustrated in FIGS. 5 and 6.

FIG. 5 provides an illustration of allocation of data storage $110_1$ in a traditional Teradata Corporation data warehouse system, wherein each AMP owns the same number of specific disk drives and places its data on those drives without consideration of data characteristics or usage.

FIG. 6 provides an illustration of allocation of data storage in a Teradata Corporation data warehouse system utilizing TVS system 230. Storage is owned by Teradata Virtual Storage and is allocated to AMPs in small pieces from a shared pool of disks. Data is automatically and transparently migrated within storage based on data temperature. Frequently used hot data is automatically migrated to the fastest storage resource. Cold data, on the other hand, is migrated to slower storage resources.

As stated earlier, starting the database system with some storage components missing can result in corruption and reuse of cylinder IDs used by TVS. A method to startup the database system when storage components are missing is described below.

To facilitate the explanation of the system and invention, the following assumptions are presented:

Storage allocations among AMPs tend to be fairly even across the system (+/– a few thousand), so keeping track of the highest cylinder index in use by each individual AMP is likely not worth the overhead required.

As mentioned above, the TVS algorithms attempt to keep the range of cylinder ID indexes as small as possible to conserve memory. Some extra memory will be used when a device is missing for this solution.

Figure 7:
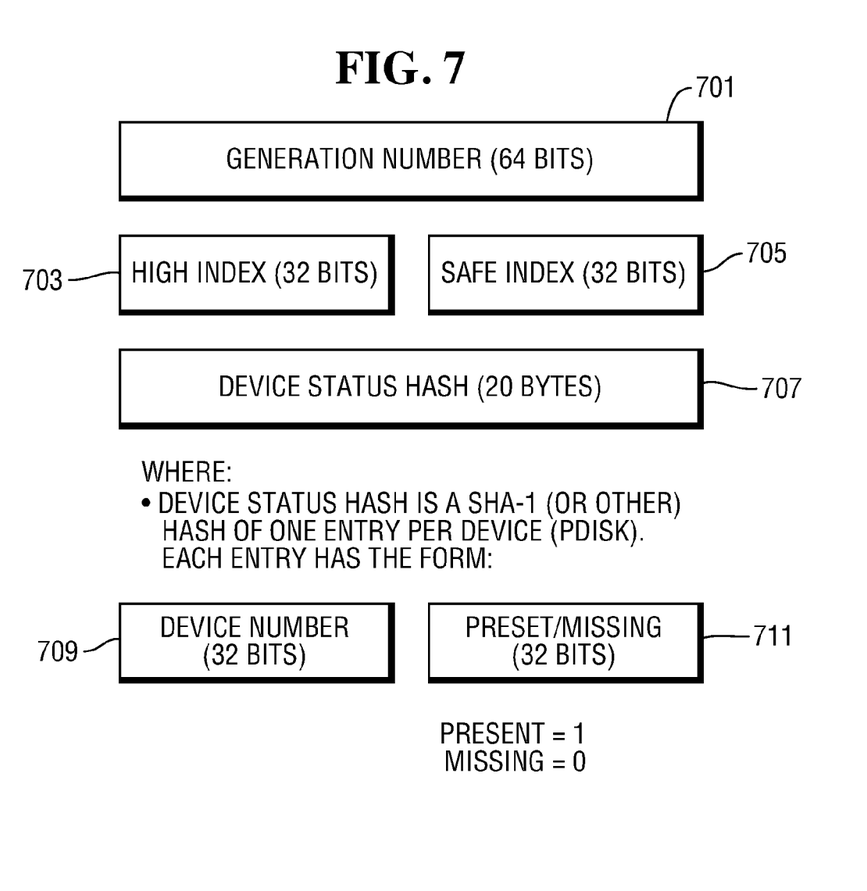
FIG. 7 provides an illustration of a data structure for tracking cylinder IDs in accordance with the present invention.
Figure 15:
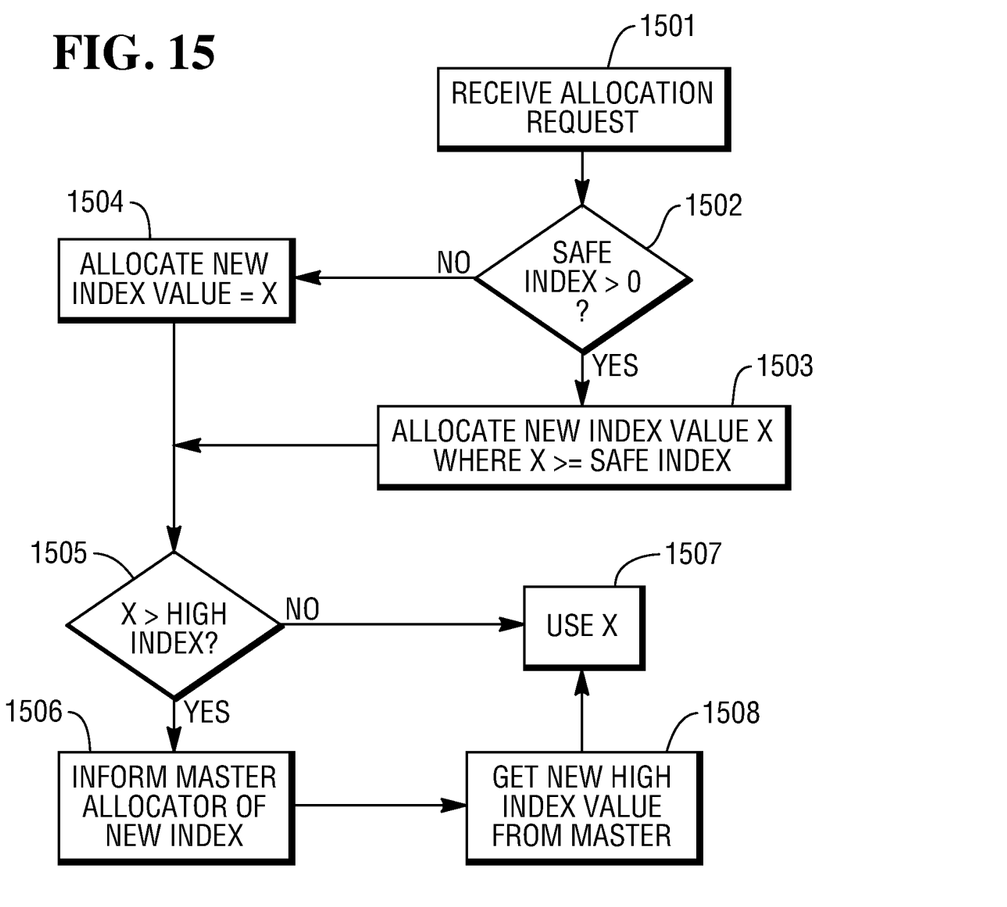
FIG. 15 is a flow diagram of an allocation process for updating data structure values during system operation.
Figure 16:
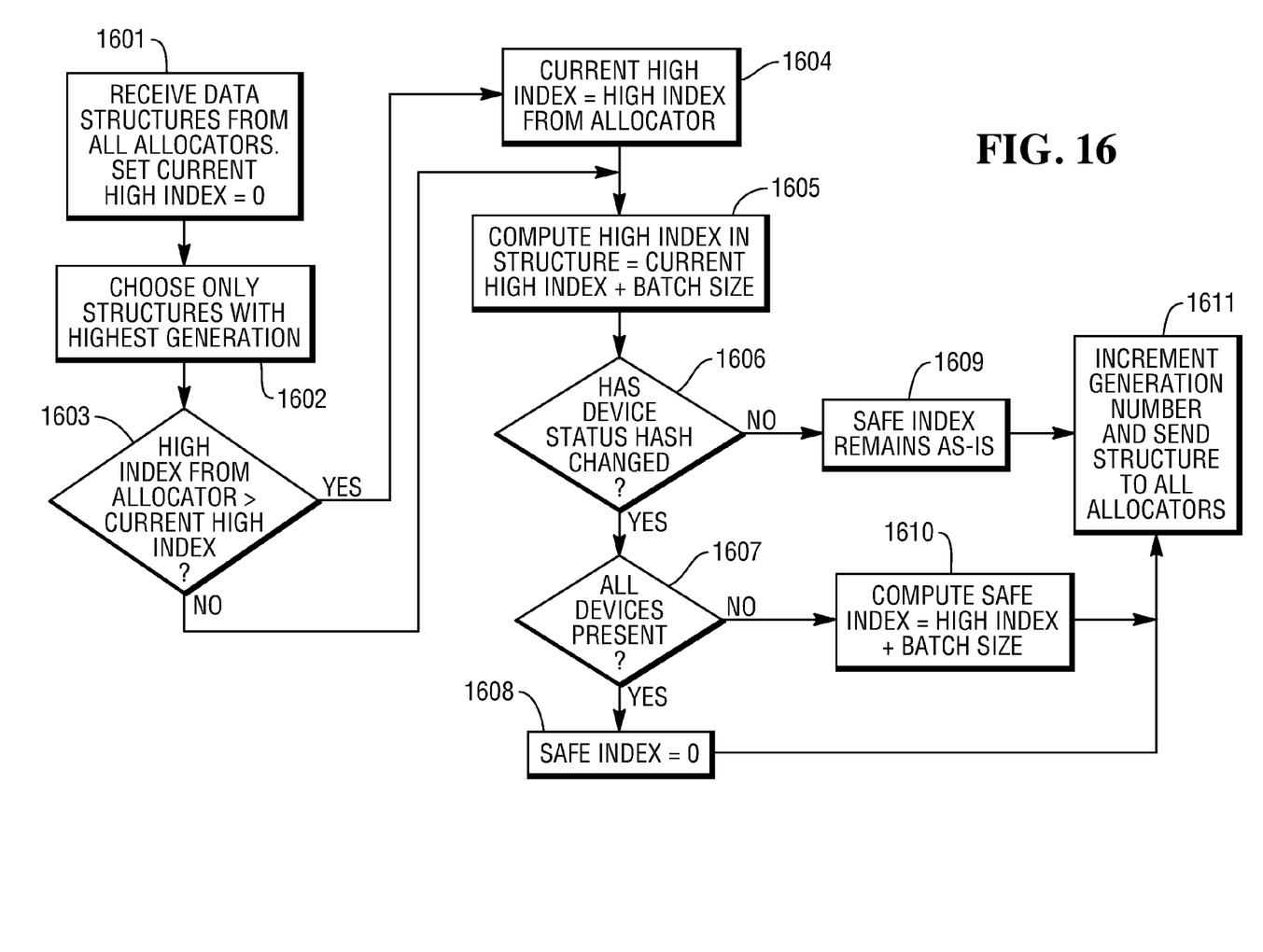
FIG. 16 is a flow diagram of an allocation process for updating data structure values during system startup.

The invention consists of a data structure, shown in FIG. 7, and a set of procedures, illustrated in FIGS. 15 and 16, for modifying the data structure and using it to prevent cylinder ID index reuse.

Minimally, the structure will contain:

A generation number 701 so that the latest incarnation of the structure can be determined.

The highest index 703 observed to be in-use by any AMP.

A "safe index" 705 which is the lowest index value that can be used for allocating new cylinder id indexes. This number is not always greater than the highest index, depending on the state of the system.

A device status hash 707. This is a checksum or hash, such as SHA-1, of an ordered set of {device number, state}, where the device number is the global device number and state is an indication of whether the device is present (1) or missing (0). There is one entry in the set for each device in a clique.

Figure 8:
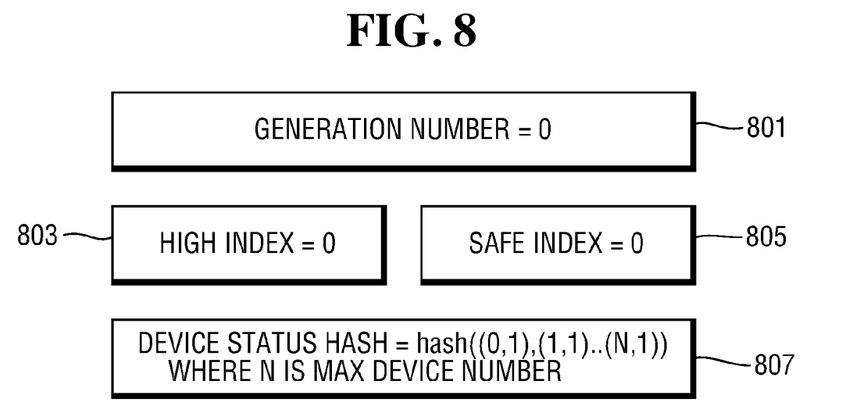
FIG. 8 provides an illustration of the initial system state represented in the data structure of FIG. 7.

Initially, all fields of the structure are zero and all devices are present, as shown in FIG. 8. FIGS. 9 through 14 provide illustrations of exemplary system states following startup represented in the data structure of FIG. 7.

The TVS system includes allocators for handling cylinder allocation. During startup, each allocator will determine the highest cylinder index in use by any of the AMPs that are assigned to it, as illustrated in FIG. 16. Allocation is completed by reading the maps on each disk, as is always done during startup. As shown in step 1601, each allocator will communicate this value and the generation number from its structure via a message to an arbitrarily chosen master allocator in the clique. There are one or more allocators on each node in the system. This master allocator will determine the highest index value of those submitted, as shown in steps 1602 through 1604; increment the highest index value by a "batch size" value, as shown in step 1605; and will send the result and a generation number, e.g., a time-stamp, and the other fields of the structure via a message to all of the allocators in the clique, as shown by step 1611. Each allocator will update its local copy of the structure and continue with startup. On subsequent startups, the master allocator will choose the highest index value from only those submissions with the highest generation number and discard the rest to protect against erroneous data from nodes that have been out of the system for a while.

FIG. 15 is a flow diagram of the allocation process for updating data structure values during system operation. As the system runs and the AMPs allocate cylinders, the allocators will compare a cylinder ID index just allocated against the highest index value, as shown by steps 1501 through 1505. If the cylinder ID index is greater than the highest index value, the allocator will send it to the master allocator, as shown by step 1506, which will increment the current highest index value by a batch size, such as a number like 10,000 or 65,536; increment the generation number, as shown in step 1508; and send out the structure to the other allocators which will transfer it to their local copies. The purpose of the batch size is to reduce the number of messages sent, since it is impractical to send messages to increment the highest index value each time a cylinder is allocated. An allocator may not record in the map or return to an AMP a cylinder index that is higher than the current "highest index" value. It must wait to receive an updated structure from the master allocator before updating the map or responding to the AMP.

The structure is kept in persistent node-local storage, such as a memory mapped file, by each allocator. It is reinitialized to zero only when the system is initialized, e.g., a sysinit.

Referring again to FIG. 16, if one or more disks are missing during startup, the master allocator will compute a new device status hash and compare it with the value currently in the structure, as shown in step 1606. If the new and current hash values match, the same devices are missing as were missing during the prior startup, their absence has already been accounted for, and the safe index does not need to be incremented, as shown by step 1609. If the hash values are different, it means that some device is now missing, or possibly has returned to service, and therefore the set of missing devices is different from the prior startup. If devices are missing, the safe index is set to the highest index value plus the batch size, as shown in steps 1607 and 1610, and the hash is updated in the structure before it is sent to the other allocators, as shown in step 1611. Allocators are only allowed to allocate new indexes starting at the safe limit to prevent reuse of any cylinder ID indexes that might be on the missing disks. The current safe limit from each allocator's local structure is sent during startup to the master and the coordinated value received from the master along with the other fields of the structure.

After the missing devices have been brought back into service and are no longer missing, the safe index is set to zero, as shown in step 1608, as there is no longer a chance of reusing a missing index.

Figure 9:
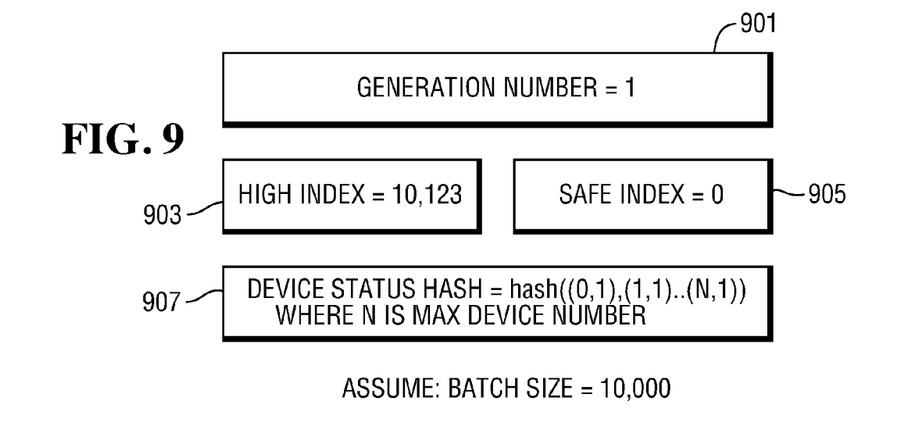
FIGS. 9 through 14 provide illustrations of exemplary system states following startup represented in the data structure of FIG. 7.
Figure 10:
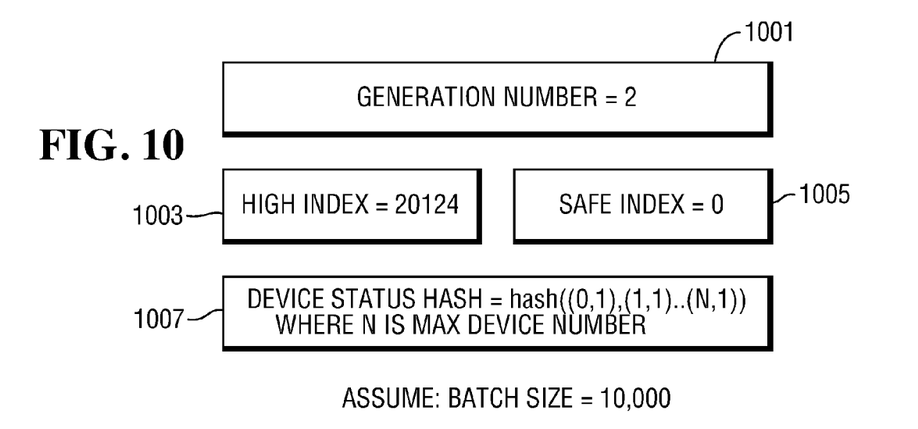
Figure 11:
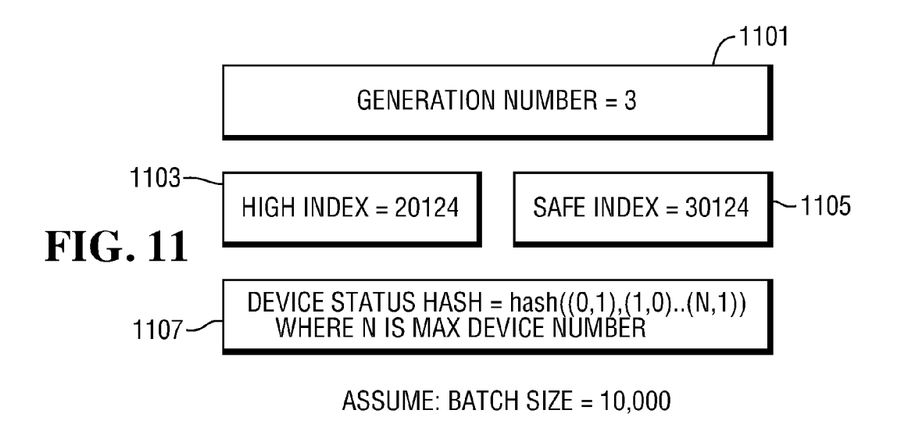
Figure 12:
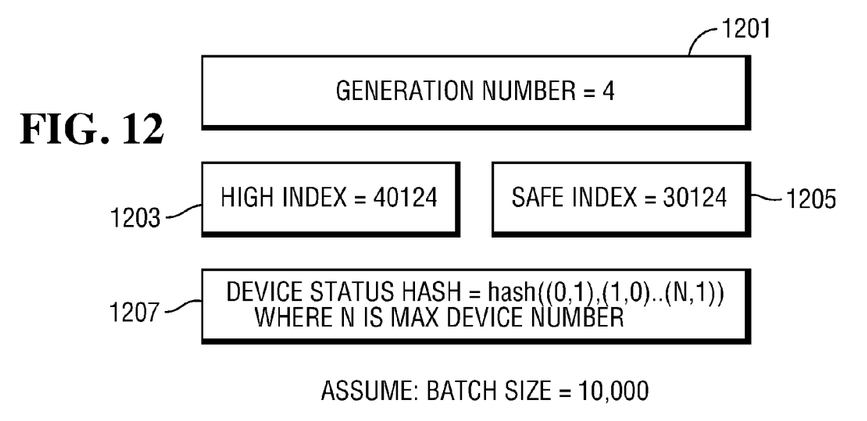
Figure 13:
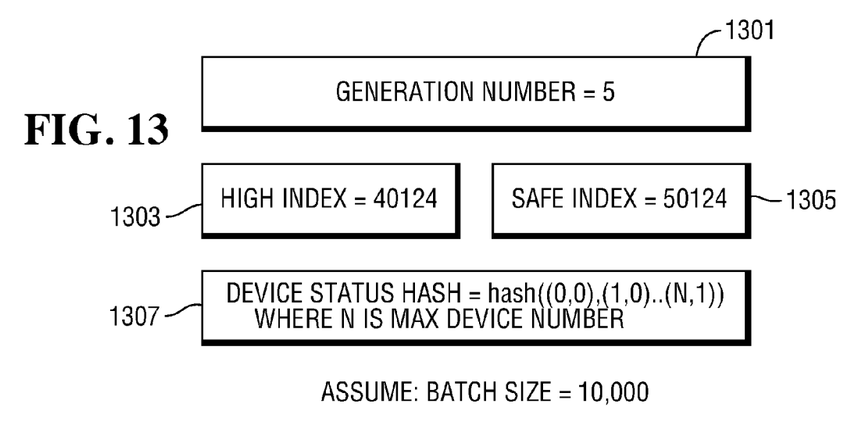
Figure 14:
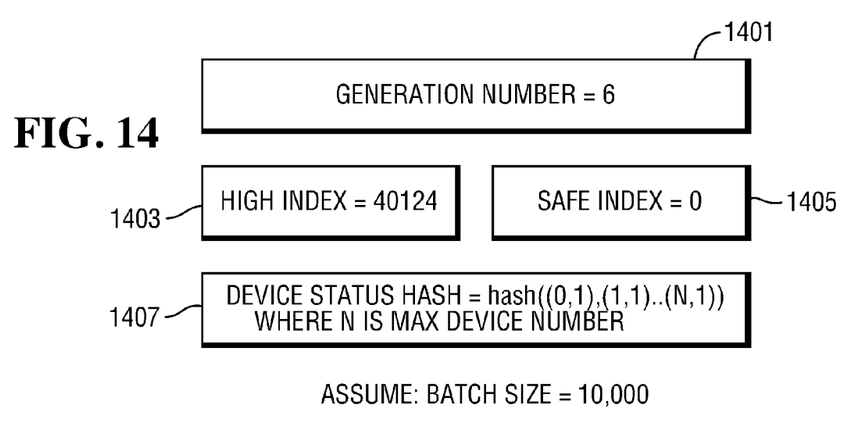

As stated earlier, FIGS. 9 through 14 provide illustrations of exemplary system states following startup represented in the data structure of FIG. 7. Assuming a batch size of 10,000, FIG. 9 illustrates the system state after startup, with all devices present and 123 entries allocated to an AMP; FIG. 10 illustrates the system state after the AMP has been allocated index 10,124; FIG. 11 shows the system state after startup with device 1 missing; FIG. 12 shows system state after first allocation following startup (index=30,124) with device 1 missing; FIG. 13 illustrates system state after startup with device 0 missing after device 1 has been missing on prior restarts; and FIG. 14 shows system state after device 0 and 1 have returned to service.

Some key features and benefits of the methodology described above and illustrated in the figures include:

Tracking of the highest index plus batch size, and setting the safe limit prevents re-use of cylinder id indexes when devices are missing;

Keeping a device status hash solves the problem of escalation and distinguishes between startups with the same set of missing devices and those with a different set;

Keeping multiple copies of the structure on multiple nodes and using a generation number allows operation with down nodes, and allows nodes to return to the system without confusion; and The structure described above consumes only about 36 bytes of memory and file space.

The foregoing description of the invention has been presented for purposes of illustration and description. It is not intended to be exhaustive or to limit the invention to the precise form disclosed.

Additional alternatives, modifications, and variations will be apparent to those skilled in the art in light of the above teaching. Accordingly, this invention is intended to embrace all alternatives, modifications, equivalents, and variations that fall within the spirit and broad scope of the attached claims.

What is claimed is:

1. In a computer system including multiple processing nodes, multiple electronic data storage devices, and at least one allocator associated with each processing node for handling data allocations for the associated processing node, a computer-implemented method for assigning cylinder identifier (ID) index values to data allocations in said computer system, the method comprising the steps of:
    selecting one of said allocators as a master allocator;
    maintaining within said computer system, a data structure associated with said master allocator, said data structure including a generation number indicating an incarnation of the data structure, and a highest cylinder ID index value observed to be in use within said data storage system;
    receiving, by one of said allocators, an allocation request;
    assigning a cylinder ID index to said allocation request;
    comparing said cylinder ID index to the highest cylinder ID index value observed to be in use within said data storage system; and
    when the cylinder ID index is greater than the highest cylinder ID index value, incrementing the generation number and highest cylinder ID index value maintained within the data structure associated with said master allocator.

2. The computer-implemented method for assigning cylinder identifier (ID) index values in accordance with claim 1, wherein:
    said highest cylinder ID index is incremented by a batch size.

3. The computer-implemented method for assigning cylinder identifier (ID) index values in accordance with claim 1, further comprising the steps of:
    maintaining a local copy of said data structure with each one of said allocators; and
    following said step of incrementing the generation number and highest cylinder ID index value maintained within the data structure associated with said master allocator, updating the local copies of said data structure.

4. The computer-implemented method for assigning cylinder identifier (ID) index values in accordance with claim 1, further comprising the steps of:
   determining during startup of the computer system the highest cylinder index value in use by any of said multiple processing nodes; and
   setting the highest cylinder ID index value maintained within the data structure associated with said master allocator to a value exceeding the highest cylinder index value in use by any of said multiple processing nodes and incrementing the generation number maintained within the data structure associated with said master allocator.

5. The computer-implemented method for assigning cylinder identifier (ID) index values in accordance with claim 4, wherein:
   said highest cylinder ID index value maintained within the data structure associated with said master allocator is set to the highest cylinder index value in use by any of said multiple processing nodes plus a batch size.

6. In a computer system including multiple processing nodes, multiple electronic data storage devices, and at least one allocator associated with each processing node for handling data allocations for the associated processing node, a computer-implemented method for assigning cylinder identifier (ID) index values to data allocations in said computer system, the method comprising the steps of:
   selecting one of said allocators as a master allocator;
   maintaining within said computer system, a data structure associated with said master allocator, said data structure including a generation number indicating an incarnation of the data structure, a highest cylinder ID index value observed to be in use within said data storage system, and a safe index value indicating a lowest cylinder ID index value for use when allocating a new cylinder index;
   receiving, by one of said allocators, an allocation request;
   assigning a cylinder ID index to said allocation request, said cylinder ID index being greater than said safe index value;
   comparing said cylinder ID index to the highest cylinder ID index value observed to be in use within said data storage system; and
   when the cylinder ID index is greater than the highest cylinder ID index value, incrementing the generation number and highest cylinder ID index value maintained within the data structure associated with said master allocator.

7. The computer-implemented method for assigning cylinder identifier (ID) index values in accordance with claim 6, wherein:
   said highest cylinder ID index is incremented by a batch size.

8. The computer-implemented method for assigning cylinder identifier (ID) index values in accordance with claim 6, further comprising the steps of:
   maintaining a local copy of said data structure with each one of said allocators; and
   following said step of incrementing the generation number and highest cylinder ID index value maintained within the data structure associated with said master allocator, updating the local copies of said data structure.

9. The computer-implemented method for assigning cylinder identifier (ID) index values in accordance with claim 6, further comprising the steps of:
   determining during startup of the computer system the highest cylinder index value in use by any of said multiple processing nodes; and
   setting the highest cylinder ID index value maintained within the data structure associated with said master allocator to a value exceeding the highest cylinder index value in use by any of said multiple processing nodes and incrementing the generation number maintained within the data structure associated with said master allocator.

10. The computer-implemented method for assigning cylinder identifier (ID) index values in accordance with claim 9, further comprising the step of:
   determining during startup of the computer system if all storage devices are present;
   when all storage devices are present, setting the safe index value maintained within the data structure associated with said master allocator to 0; and
   when all storage devices are not present, setting the safe index value maintained within the data structure associated with said master allocator to said highest cylinder ID index plus a batch size.

11. The computer-implemented method for assigning cylinder identifier (ID) index values in accordance with claim 9, wherein:
   said highest cylinder ID index value maintained within the data structure associated with said master allocator is set to the highest cylinder index value in use by any of said multiple processing nodes plus a batch size.

* * * * *